United States Patent
Marcotte et al.

(10) Patent No.: US 12,097,845 B2
(45) Date of Patent: Sep. 24, 2024

(54) SYSTEMS AND METHODS FOR IDENTIFYING HIGH-RISK DRIVING SITUATIONS FROM DRIVING DATA

(71) Applicant: TOYOTA RESEARCH INSTITUTE, INC., Los Altos, CA (US)

(72) Inventors: Ryan Marcotte, Ann Arbor, MI (US); Marcus McCoy Hammond, Redwood City, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 371 days.

(21) Appl. No.: 16/950,500

(22) Filed: Nov. 17, 2020

(65) Prior Publication Data

US 2022/0126818 A1 Apr. 28, 2022

Related U.S. Application Data

(60) Provisional application No. 63/106,624, filed on Oct. 28, 2020.

(51) Int. Cl.
*B60W 30/09* (2012.01)
*B60W 30/095* (2012.01)
(Continued)

(52) U.S. Cl.
CPC .......... *B60W 30/09* (2013.01); *B60W 30/095* (2013.01); *B60W 40/09* (2013.01); *G06N 20/00* (2019.01); *B60W 2540/30* (2013.01)

(58) Field of Classification Search
CPC .... B60W 30/09; B60W 30/095; B60W 40/09; G06N 20/00
See application file for complete search history.

(56) References Cited

U.S. PATENT DOCUMENTS

| 6,023,221 | A  | * | 2/2000 | Michelotti | B60Q 1/52 340/471 |
| 8,095,483 | B2 | * | 1/2012 | Weston | G16B 40/20 706/62 |

(Continued)

FOREIGN PATENT DOCUMENTS

| CN | 101635835 A | 1/2020 |
| EP | 3382342 A1 | 3/2018 |

(Continued)

OTHER PUBLICATIONS

"Li, Howell; Leveraging Connected Vehicles to Provide Enhanced Roadway Condition Information; May 29, 2020; Journal of Transportation Engineering, Part A: Systems; vol. 146, Issue 8" (Year: 2020).*

(Continued)

*Primary Examiner* — Russell Frejd
*Assistant Examiner* — Christopher R Cardimino
(74) *Attorney, Agent, or Firm* — DINSMORE & SHOHL LLP

(57) ABSTRACT

A method for identifying high-risk driving situations in driving data may include receiving driving data, identifying trigger events in the driving data, and using the trigger events in combination with first portions of the driving data corresponding to periods of time preceding the trigger events, training a machine learning model to identify features, in the driving data, associated with the trigger events. The method may further include using second portions of the driving data where no trigger events are identified, further training the machine learning model to ignore features common to both the first portions and the second portions. The method further includes detecting a high risk driving situation in real time driving data by using the machine learning model to identify the features associated with the trigger events, and performing a defensive driving (Continued)

maneuver in response to the detection of the high risk driving situation.

18 Claims, 4 Drawing Sheets

(51) Int. Cl.
*B60W 40/09* (2012.01)
*G06N 20/00* (2019.01)

(56) References Cited

U.S. PATENT DOCUMENTS

| | | | |
|---|---|---|---|
| 9,928,432 B1 * | 3/2018 | Sathyanarayana | B60W 40/09 |
| 10,414,395 B1 * | 9/2019 | Sapp | G01S 13/00 |
| 10,430,695 B2 * | 10/2019 | Sathyanarayana | G06Q 10/00 |
| 10,453,150 B2 * | 10/2019 | Thompson | G06Q 50/40 |
| 10,507,813 B2 * | 12/2019 | Zhu | B60T 8/58 |
| 10,633,001 B2 * | 4/2020 | Ferguson | B60W 40/09 |
| 10,649,458 B2 | 5/2020 | Sun et al. | |
| 11,230,243 B2 * | 1/2022 | Kumar | G05D 1/0088 |
| 11,518,380 B2 * | 12/2022 | Kuehnle | B60W 30/085 |
| 2019/0049980 A1 | 2/2019 | Chen et al. | |
| 2019/0101914 A1 | 4/2019 | Edgar et al. | |
| 2020/0065711 A1 | 2/2020 | Clement et al. | |

FOREIGN PATENT DOCUMENTS

| | | | |
|---|---|---|---|
| WO | WO-2018127962 A1 * | 7/2018 | G08G 1/16 |
| WO | WO-2020005894 A1 * | 1/2020 | B60W 40/04 |

OTHER PUBLICATIONS

"Shirazi, Mohammad et al.; Looking at Intersections: A Survey of Intersection Monitoring, Behavior and Safety Analysis of Recent Studies;Jan. 2017; IEEE Transactions on Intelligent Transportation Systems, vol. 18, No. 1" (Year: 2017).*

* cited by examiner

SYSTEMS AND METHODS FOR IDENTIFYING HIGH-RISK DRIVING SITUATIONS FROM DRIVING DATA

TECHNICAL FIELD

The present specification generally relates to driver assistance features and, more specifically, identifying high risk driving situations for all levels of autonomous vehicles.

BACKGROUND

Vehicles increasingly include driver assistance features such as lane departure warning, adaptive cruise control, blind spot warning, or assisted parking. Driver assistance features may be included in various levels of autonomous vehicles ranging from level 1 partially autonomous vehicles to level 5 fully autonomous vehicles. Although autonomous vehicles can detect hard breaking, or collisions, it is difficult for autonomous vehicles to predict risky driving situations that may be present before a collision or hard breaking event occurs. Sensor data across a fleet of vehicles is extremely voluminous and thus, it is difficult to find training examples of risky driving situations.

Accordingly, a need exists for alternative systems and methods for identifying high-risk driving situations from driving data.

SUMMARY

In one embodiment, a method for identifying high-risk driving situations in driving data may include receiving driving data, identifying trigger events in the driving data, and using the trigger events in combination with first portions of the driving data corresponding to periods of time preceding the trigger events, training a machine learning model to identify features, in the driving data, associated with the trigger events. The method may further include using second portions of the driving data where no trigger events are identified, further training the machine learning model to ignore features common to both the first portions and the second portions. The method further includes detecting a high risk driving situation in real time driving data by using the machine learning model to identify the features associated with the trigger events, and performing a defensive driving maneuver in response to the detection of the high risk driving situation.

In another embodiment, the method may include further training the machine learning model, using the identified features associated with the trigger events, to identify a secondary trigger event. The secondary trigger event may include features of the sensor data which tend to follow the high risk driving situation and were not initially identified as trigger events. The method may further include using the secondary trigger events as training data to further train the machine learning model to refine the identification of the features, in the driving data, associated with the trigger events.

In yet another embodiment, the driving data may include sensor data, and the identifying of trigger events may include analyzing sensor data to identify one or more of air bag deployment, hard braking, fast acceleration, swerving, close proximity to obstacles, or collision.

In yet another embodiment, the driving data may include one or more of vehicle position information, vehicle speed information, or vehicle trajectory information of one or more vehicles.

In yet another embodiment, the defensive maneuver may include a maneuver that reduces risk of a current driving situation. The risk may include a probability that a driving situation will result in a trigger event.

In yet another embodiment, a system for detecting high risk driving situations, the system includes one or more sensors configured to generate driving data, and a trigger event identifier configured to identify trigger events in the driving data. The system further includes a machine learning model trained to identify features associated with the identified trigger events in first portions of the driving data corresponding to periods of time preceding the trigger events. The machine learning model is configured to detect a high risk driving situation in real-time driving data by identifying the features associated with the identified trigger events in the real-time driving data. The system may further include a vehicle controller configured to perform a defensive driving maneuver in response to the detection of the high risk driving situation.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments disclosed herein are applicable to autonomous vehicles. Autonomous vehicles may include any kind of autonomous vehicle from level 1 autonomous vehicles having driver assistance features, to fully automated level 5 autonomous vehicles.

Figure 1:
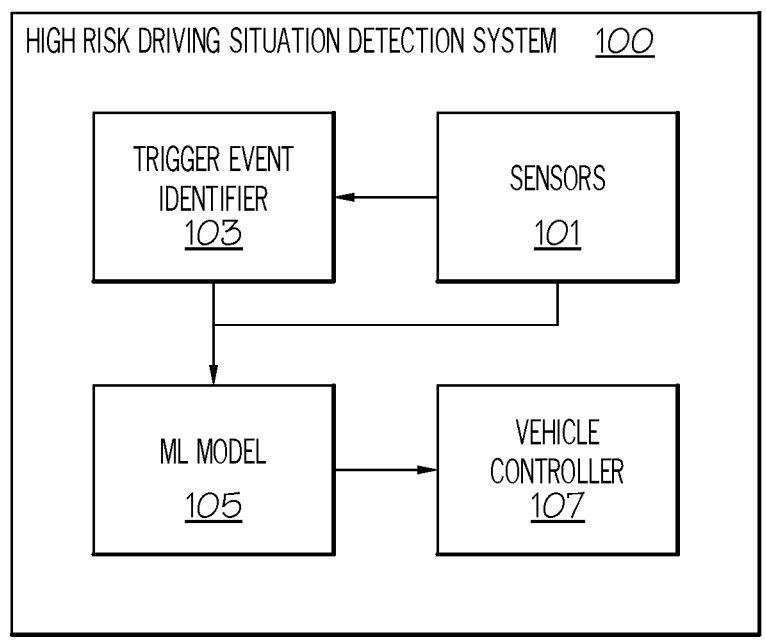
FIG. 1 depicts a block diagram of a system for detecting high risk driving situations according to one or more embodiments shown and described herein.

FIG. 1 generally depicts one embodiment of a high risk driving situation detection system 100. The system 100 may include sensors 101, a trigger event identifier 103, a machine learning model 105, and a vehicle controller. Sensors 101 may comprise, but are not limited to, one or more of a camera, radar, LIDAR, sonar, GPS, any sensor on a vehicle CAN bus or any sensor included in an autonomous vehicle. Sensors may also include wireless communication devices configured to receive weather data, traffic data, or sensor data from other vehicles.

The sensors 101 may be configured to generate driving data. Driving data may include sensor data of an ego vehicle or sensor data corresponding to nearby vehicles. The driving data generated by the sensors 101 may include vehicle position information, vehicle speed information, or vehicle trajectory information of one or more vehicles. Embodiments described herein are not limited to any particular type of sensor data or driving data and one of ordinary skill in the art would understand that any data generated or used by autonomous vehicles may be used by the disclosed embodiments to identify high risk driving situations.

The trigger event identifier 103 may be implemented using hardware, software, or a combination of hardware and software. According to some embodiments, the trigger event identifier 103 may be implemented using a computing device. The trigger event identifier 103 is configured to identify trigger events in the driving data such as, but not limited to, one or more of air bag deployment, hard braking, fast acceleration, swerving, close proximity to obstacles, or collision. According to some embodiments, definitions of trigger events may be provided to the trigger event identifier 103, and the trigger event identifier 103 may identify trigger events based on the definitions.

A definition of a trigger event may be dependent on the trigger event and the type of data corresponding to the trigger event. Some trigger events, such as airbag deployment and collision, are binary in that the driving data may indicate the trigger event has either occurred or has not occurred. As a non-limiting example, an airbag code or a binary indicator of air bag deployment may be read from the CAN bus of a vehicle or read directly from an airbag sensor of the vehicle. Other trigger events are a matter of degree, and may be identified based on sensor data exceeding a threshold. As a non-limiting example, when a brake pedal position is maxed or nearly maxed, this may be considered a hard braking trigger event. As another non-limiting example, hard braking may be detected based on a spike in accelerometer data, or a rapid change in brake pedal position that exceeds normal operation generally considered to be safe. Once trigger events are defined either by a threshold of sensor data, or a binary indicator, the trigger event identifier can analyze driving data to identify defined trigger events.

Trigger events may include events that precede or coincide with undesirable driving events, such as a collision or loss of control of the vehicle. Often, a driver or a vehicle controller is unable to avoid these undesirable driving events in the time between detecting trigger events and an undesirable driving event. Therefore, it is desirable to be able to identify high-risk driving situations. High-risk driving situations may include driving situations that tend to be associated with and precede trigger events. High risk driving situations may be characterized by one or more features that exist in the driving data. The features of driving data that are indicative of these high risk driving situations may be difficult to identify and impossible to explicitly enumerate programmatically. According to embodiments disclosed herein, a machine learning model 105 may be trained to identify the features of driving data that are associated with and predictive of trigger events. Driving data used for training need not be limited to driving data from autonomous vehicles, as even level 0 vehicles may provide data useful for training a machine learning model 105 according to the disclosed embodiments.

The machine learning model 105 may include but is not limited to Neural Networks, Linear Regression, Logistic Regression, Decision Tree, SVM, Naive Bayes, kNN, K-Means, Random Forest, Dimensionality Reduction Algorithms, or Gradient Boosting algorithms, and may employ learning types including, but not limited to, Supervised Learning, Unsupervised Learning, Reinforcement Learning, Semi-Supervised Learning, Self-Supervised Learning, Multi-Instance Learning, Inductive Learning, Deductive Inference, Transductive Learning, Multi-Task Learning, Active Learning, Online Learning, Transfer Learning, or Ensemble Learning. According to some embodiments, a recurrent neural network may be used in order to capture temporal relationships, in the driving data, for predicting trigger events.

The machine learning model may be trained, using the identified trigger events and the driving data, to identify features of the driving data associated with high risk driving situations. According to an embodiment, the machine learning model 105 may be trained using historical driving data, such as driving data generated by a fleet of vehicles or crowdsourced driving data. However, the disclosed embodiments may also be trained using real-time driving data. According to some embodiments, the machine learning model may be continuously trained using real-time driving data as the real-time driving data becomes available from sensors of one or more vehicles. According to some embodiments, the machine learning model may be further trained, using the driving data, to identify actions taken by drivers that, when taken in high risk driving situations, reduce the occurrence of trigger events following the high risk driving situations.

The trained machine learning model may be configured to receive real-time driving data, and identify high risk driving situations, by identifying features in the real-time driving data that tend to precede trigger events. The identification of risk in driving situations may take the form of a risk level. As a non-limiting example, a risk level of a driving situation may include a probability that the driving situation will result in a trigger event. This risk level may be sent to the vehicle controller 107. According to some embodiments, the vehicle controller 107 may be configured to identify a high risk driving situation based on the risk level exceeding a threshold.

The vehicle controller 107 may include an adaptive cruise control system configured to respond to various levels of risk detected by the machine learning model. The adaptive cruise control of the vehicle controller 107 may be configured to perform a defensive maneuver in response to detection of the high risk driving situation. A defensive maneuver may comprise a maneuver that reduces a risk level of the driving situation. As a non-limiting example, a defensive maneuver performed by the adaptive cruise control system may include changing vehicle speed, changing a following distance, changing lanes, changing a lateral position within a lane, moving out of another vehicle's blind spot, or other maneuvers that reduce probability of a trigger event. Thus, the vehicle controller may include a context aware cruise control system that is capable of responding to changes in context and changes in risk level rather than merely changes in speed of the leading vehicle. The vehicle controller 107 may be implemented using a computing device, hardware, software, or a combination thereof.

Figure 2:
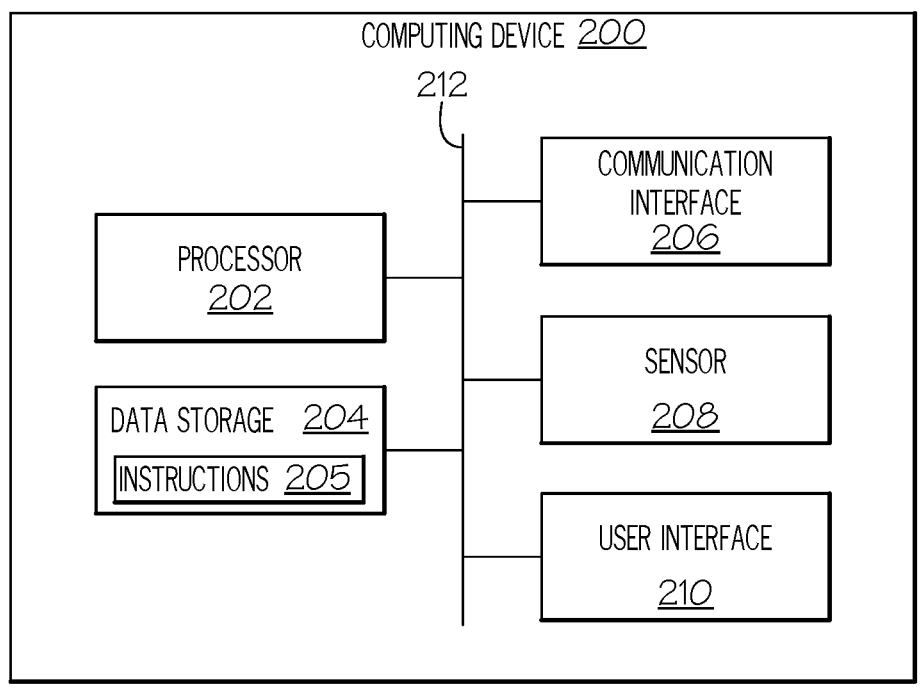
FIG. 2 depicts a block diagram of a computing device, according to one or more embodiments shown and described herein.

FIG. 2 depicts a block diagram of a computing device, according to one or more embodiments shown and described herein. As shown, a computing device 200 may include a processor 202, and data storage 204 including instructions 205. The computing device may further include a communication interface 206, a sensor 208, and a user interface 210, each of which are communicatively connected via a system bus 212. Any component or combination of components of the disclosed embodiments may take the form of or include a computing device 200. It should be understood that computing device 200 may include different and/or additional components, and some or all of the functions of a given component could instead be carried out by one or more different components. Additionally, computing device 200 could take the form of (or include) a plurality of computing devices, and some or all of the functions of a given component could be carried out by any combination of one or more of the computing devices in the plurality.

Processor 202 may take the form of one or more general-purpose processors and/or one or more special-purpose processors, and may be integrated in whole or in part with data storage 204, communication interface 206, sensor 208, user interface 210, and/or any other component of computing device 200, as examples. Accordingly, processor 202 may take the form of or include a controller, an integrated circuit, a microchip, a central processing unit (CPU), a microprocessor, a system on a chip (SoC), a field-programmable gate array (FPGA), and/or an application-specific integrated circuit (ASIC), among other possibilities.

Data storage 204 may take the form of a non-transitory computer-readable storage medium such as a hard drive, a solid-state drive, an erasable programmable read-only memory (EPROM), a universal serial bus (USB) storage device, a compact disc read-only memory (CD-ROM) disk, a digital versatile disc (DVD), a relational database management system (RDBMS), any other non-volatile storage, or any combination of these, to name just a few examples.

Instructions 205 may be stored in data storage 204, and may include machine-language instructions executable by processor 202 to cause computing device 200 to perform the computing-device functions described herein. Additionally or alternatively, instructions 205 may include script instructions executable by a script interpreter configured to cause processor 202 and computing device 200 to execute the instructions specified in the script instructions. In an embodiment, the instructions include instructions executable by the processor to cause the computing device to execute a machine learning model, such as an artificial neural network. It should be understood that instructions 205 may take other forms as well. The instructions may define the machine learning model and the machine learning model may be stored in the data storage 204.

Additional data may be stored in data storage 204, such as observed vehicle trajectories, indicated similarities and/or classifications of observed vehicle trajectories, an intermediate space of intermediate representations of observed vehicle trajectories, and/or network parameters of a neural network, as will be described in further detail below. The additional data could be stored such as a table, a flat file, data in a filesystem of the data storage, a heap file, a B+ tree, a hash table, a hash bucket, or any combination of these, as examples.

Communication interface 206 may be any component capable of performing the communication-interface functions described herein, including facilitating wired and/or wireless communication between computing device 200 and another entity. As such, communication interface 206 could take the form of an Ethernet, Wi-Fi, Bluetooth, and/or USB interface, among many other examples. Communication interface 206 may receive data over a network via communication links, for instance.

Sensor 208 could take the form of one or more sensors operable to perform any of the sensor functions described herein. The sensor could be positioned on a vehicle, including an interior and/or exterior of a vehicle. Though sensor 208 may be referenced in the singular throughout this disclosure, it should be understood that sensor 208 may take the form of (or include) a single sensor or multiple sensors.

The sensor could include a radar sensor, a LIDAR sensor, a camera, an accelerometer, a speedometer, or any combination of these or other sensors. The radar sensor, LIDAR sensor, and/or camera may obtain signals (such as electromagnetic radiation) that can be used by computing device 200 to obtain information regarding a road agent and/or other objects in an environment of a vehicle or other entity of the disclosed embodiments. For example, the radar sensor and/or LIDAR sensor may send a signal (such as pulsed laser light or radio waves) and may obtain a distance measurement from the sensor to the surface of a road agent or other object based on a time of flight of the signal—that is, the time between when the signal is sent and when the reflected signal (reflected by the object surface) is received by the sensor. The camera may collect light or other electromagnetic radiation and may generate an image representing a trajectory of a road agent or an environment of a system entity based on the collected radiation. Additionally or alternatively, the accelerometer and the speedometer may be used to detect an acceleration and a speed of a road agent, respectively. Sensor 208 may take other forms as well.

User interface 210 may be any component capable of carrying out the user-interface functions described herein. For example, the user interface may be configured to receive input from a user and/or output information to the user. Output may be provided via a computer monitor, a loudspeaker (such as a computer speaker), or another component of (or communicatively linked to) computing device 200. User input might be achieved via a keyboard, a mouse, or other component communicatively linked to the computing device. As another possibility, input may be realized via a touchscreen display of the computing device in the form of a smartphone or tablet device. Some components may provide for both input and output, such as the aforementioned touchscreen display. It should be understood that user interface 210 may take numerous other forms as well.

System bus 212 may be any component capable of performing the system-bus functions described herein. In an embodiment, system bus 212 is any component configured to transfer data between processor 202, data storage 204, communication interface 206, sensor 208, user interface 210, and/or any other component of computing device 200. In an embodiment, system bus 212 includes a traditional bus as is known in the art. In other embodiments, system bus 212 includes a serial RS-232 communication link, a USB communication link, and/or an Ethernet communication link, alone or in combination with a traditional computer bus, among numerous other possibilities. In some examples, system bus 212 may be formed from any medium that is capable of transmitting a signal, such as conductive wires, conductive traces, or optical waveguides, among other possibilities. Moreover, system bus 212 may be formed from a combination of mediums capable of transmitting signals. The system bus could take the form of (or include) a vehicle bus, such as a local interconnect network (LIN) bus, a controller area network (CAN) bus, a vehicle area network (VAN) bus, or any combination of these or mediums. It should be understood that system bus 212 may take various other forms as well.

Figure 3:
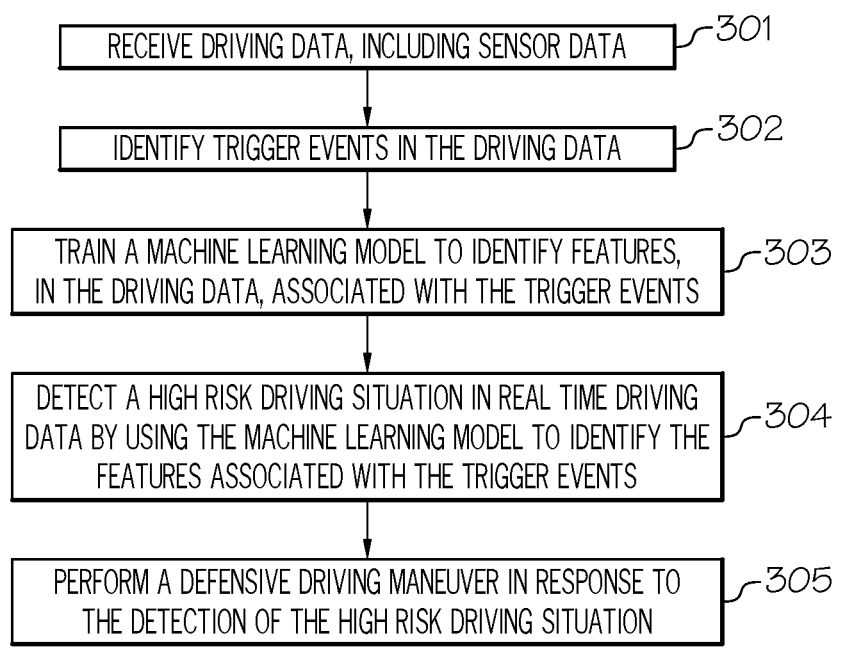
FIG. 3 depicts a flow chart illustrating a method of detecting high risk driving situations, according to one or more embodiments shown and described herein.

FIG. 3 depicts a flow chart illustrating a method of detecting high risk driving situations, according to one or more embodiments shown and described herein. According to some embodiments, the steps illustrated in FIG. 3 may be performed by a computing device 200. At step 301, the high-risk driving situation detection system 100 receives driving data, including sensor data. Driving data may include sensor data of an ego vehicle or sensor data corresponding to nearby vehicles. According to some embodiments, sensor data may be generated by one or more sensors 101. The driving data generated by the sensors 101 may include vehicle position information, vehicle speed information, or vehicle trajectory information of one or more vehicles. Sensors 101 may comprise, but are not limited to, one or more of a camera, radar, LIDAR, sonar, GPS, any sensor on a vehicle CAN bus or any sensor included in an autonomous vehicle. Sensors may also include wireless communication devices configured to receive weather data, traffic data, or sensor data from nearby vehicles.

At step 302, the high-risk driving situation detection system 100 identifies trigger events in the driving data. According to some embodiments, step 302 may be performed by a trigger event identifier 103. The trigger event identifier 103 is configured to identify trigger events in the driving data such as, but not limited to, one or more of air bag deployment, hard braking, fast acceleration, swerving, close proximity to obstacles, or collision. According to disclosed embodiments, definitions of trigger events may be provided to the trigger event identifier 103, and the trigger event identifier 103 may identify trigger events based on the definitions.

At step 303, the high-risk driving situation detection system 100 may train a machine learning model 105 to identify features, in the driving data, associated with the trigger events. Training the machine learning model may include using the identified trigger events in the driving data and driving data from a period of time preceding the trigger events. The machine learning model 105 may be configured to identify relationships between the trigger events and features of the driving data in the period of time preceding the trigger events. The relationships may be characterized as a probability that the trigger event will occur given that a feature is identified in the driving data. Training the machine learning model 105 is explained in greater detail in relation to FIG. 5.

At step 304, the high-risk driving situation detection system 100 may detect a high risk driving situation in real time driving data by using the trained machine learning model 105 to identify the features associated with the trigger events. As a non-limiting example, the machine learning model 105 may receive the driving data and generate a probability of a trigger event based on the features present in the driving data. As the machine learning model 105 detects more features in the driving data that are associated with trigger events, the probability or risk level generated by the machine learning model 105 may be higher. The probability of a trigger event may change over time as new driving data is received and as old driving data becomes less relevant to the prediction of trigger events.

At step 305, the high-risk driving situation detection system 100 may perform a defensive driving maneuver in response to the detection of the high risk driving situation. According to some embodiments, the vehicle controller of the high-risk driving situation detection system 100 may cause the vehicle to perform the defensive maneuver. The defensive maneuver may be a maneuver that reduces risk of a current driving situation. As a non-limiting example, a defensive maneuver may include reducing speed, changing lanes, changing lane position, moving out of another vehicle's blind spot, or other maneuvers that reduce probability of a trigger event.

Figure 4:
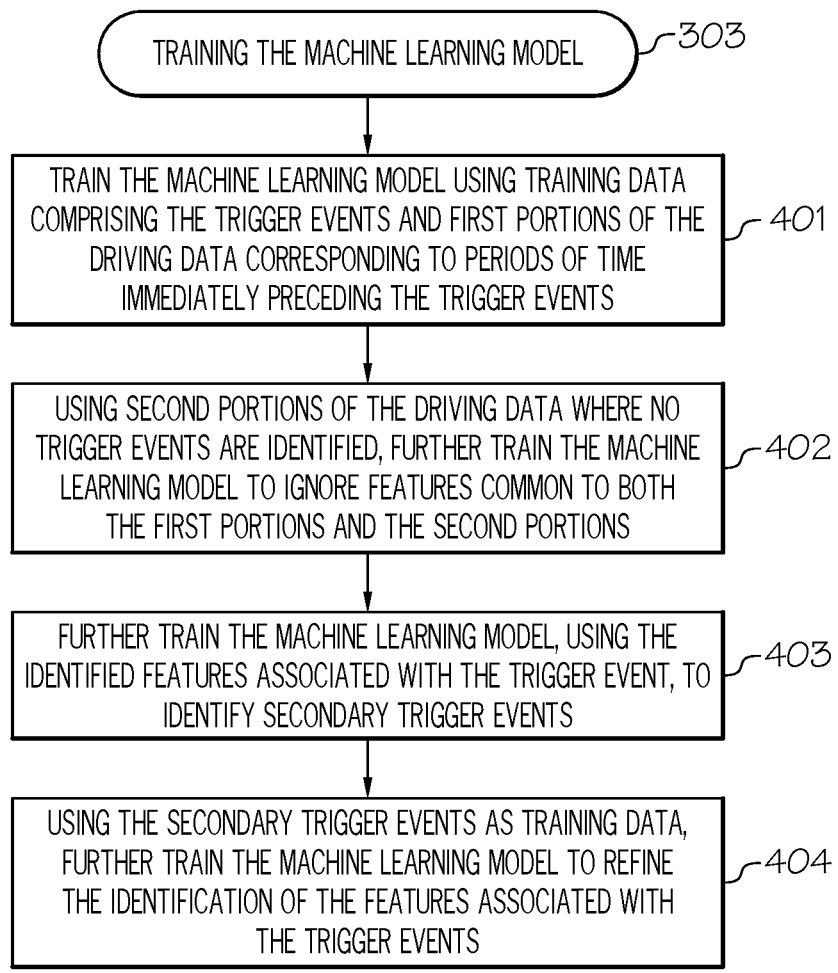
FIG. 4 depicts a flow chart illustrating a method of training a machine learning model to detect high risk driving situations, according to one or more embodiments shown and described herein.

FIG. 4 depicts a flow chart illustrating a method of training a machine learning model to detect high risk driving situations, according to one or more embodiments shown and described herein. According to some embodiments, the steps illustrated in FIG. 3 may be performed by a computing device 200. The method of FIG. 4 may be performed in step 303 of FIG. 3.

At step 401, the high-risk driving situation detection system 100 trains the machine learning model using training data comprising the trigger events and first portions of the driving data corresponding to periods of time preceding the trigger events. The machine learning model 105 may be configured to identify relationships between the trigger events and features of the driving data. Because the relationships are identified based on features identified in portions of the driving data that precede the trigger events, the relationships may be treated as predictive of the trigger events. The machine learning model 105 may be configured to identify relationship between the trigger events and features of the driving data, including any of one-to-one relationships, one-to-many relationships, many-to-on relationships e, or many-to-many relationships. The periods of time preceding the trigger events may include periods of time immediately preceding the trigger events.

At step 402, the high-risk driving situation detection system 100 may use second portions of the driving data where no trigger events are identified, to further train the machine learning model to ignore features common to both the first portions and the second portions. Because some features of the driving data may be very common in the driving data, and thus present in both high risk and low risk driving situations, it may be desirable to train the machine learning model 105 to ignore these common features and focus only on features that are uniquely associated with and predictive of trigger events. Therefore, training the machine learning model, using second portions of the training data that are not followed by a trigger event allows the machine learning model 105 to learn to ignore common events that are present in both the first portions and second portions of the driving data.

At step 403, the high-risk driving situation detection system 100 may further train the machine learning model 105, using the identified features associated with the trigger events, to identify secondary trigger events. Secondary trigger events may comprise features of the sensor data which tend to follow a high risk driving situation and were not initially identified as trigger events. Once the machine learning model 105 has identified features in the driving data that are predictive of the trigger events, the machine learning model 105 may be further trained to identify secondary trigger events also predicted by the features in the first portions of the driving data. The identification of secondary trigger events may enable the machine learning model 105 to be further trained to refine identification of high risk driving situations, including risks not represented by the trigger events that were explicitly defined and used in the initial training.

At step 404, the high risk driving situation detection system 100 may use the secondary trigger events as training data to further train the machine learning model to refine the identification of the features associated with the trigger events. Using both the identified trigger events and the secondary trigger events identified through machine learning, the machine learning model 105 may more completely identify driving events that are either undesirable or closely associated with undesirable outcomes. The combination of trigger events and secondary trigger events may be used as training data to further refine the identification of high risk driving situations by the machine learning model 105. Refining identification of the high risk driving situations may include identifying additional high-risk driving situations and/or identifying additional features of the driving data that are predictive of the trigger events and/or secondary trigger events. This type of layered training of the machine learning model can be used to refine the identification of both undesirable driving events and driving situations that are predictive of undesirable driving events.

As a non-limiting example provided for illustrative purposes only, a trigger event may include hard breaking and the machine learning model may identify features of the driving data that are predictive of hard breaking. The machine learning model may then be further trained, as in step 403, to identify a secondary trigger event of turning on hazard lights. It may be that turning on hazard lights is not closely associated with hard breaking, but is often predicted by the same set of features in the driving data that are also predictive of hard breaking. Further, the secondary trigger event of turning on hazard lights may be predicted by a second set of features in the driving data that is different from the set of features identified as predictive of hard breaking. Therefore, once a secondary trigger event is identified and defined, it may then be identified in other portions of the driving data or in real-time driving data and used to further train the machine learning model to refine identification of high risk driving situations. Of course, this example based on hard breaking and turning on hazard lights is relatively easy to identify and is therefore used here only to illustrate the concepts described in the disclosed embodiments. In practice, secondary trigger events may include events not easily identified, and may be difficult or impossible to enumerate or define programmatically. Therefore, the machine learning model may be able to identify additional features of the driving data, that are undesirable or associated with undesirable outcomes, which would otherwise not be considered in identifying high risk driving situations.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for identifying high-risk driving situations in driving data, the method comprising:
   identifying trigger events in driving data;
   using the trigger events in combination with first portions of the driving data corresponding to periods of time preceding the trigger events, training a machine learning model to identify features, in the driving data, associated with the trigger events;
   when a high risk driving situation occurs:
      detecting the high risk driving situation in real time driving data by using the machine learning model to identify the features associated with the trigger events;
      performing a defensive driving maneuver in response to the detection of the high risk driving situation;
      further training the machine learning model, using the identified features associated with the trigger events, to identify a secondary trigger event;
      wherein secondary trigger event comprises features of sensor data which follow the high risk driving situation and were not initially identified as the trigger events, and the secondary trigger event is predicted by the features that are predictive of the trigger events; and
      using the secondary trigger event as training data to further train the machine learning model to refine the identification of the features, in the driving data, associated with the trigger events; and
   generating a prediction of the high risk driving situation in real time driving data by using the machine learning model to identify the features associated with the secondary trigger event, wherein at least one trigger event includes hard braking and the secondary trigger event includes turning on hazard lights.

2. The method of claim 1, further comprising:
   using second portions of the driving data where no trigger events are identified, further training the machine learning model to ignore features common to both the first portions and the second portions.

3. The method of claim 1, wherein the driving data comprises the sensor data, and wherein the identifying of the trigger events comprises analyzing the sensor data to identify one or more of air bag deployment, the hard braking, fast acceleration, swerving, close proximity to obstacles, or collision.

4. The method of claim 1, wherein the driving data comprises one or more of vehicle position information, vehicle speed information, or vehicle trajectory information of one or more vehicles.

5. The method of claim 1, wherein the defensive maneuver comprises a maneuver that reduces risk of a current driving situation,
   wherein the risk comprises a probability that a driving situation will result in the trigger event.

6. The method of claim 1, wherein the identifying of the trigger events in the driving data comprises:
   receiving a trigger event definition of the trigger event, defining one or more thresholds of the driving data; and
   identifying the trigger event based on the trigger event definition including the sensor data exceeding the one or more thresholds.

7. A non-transitory computer-readable medium storing instructions that, when executed by a processor, cause the processor to perform the steps of:
   identifying trigger events in driving data;
   using the trigger events in combination with first portions of the driving data corresponding to periods of time preceding the trigger events, training a machine learning model to identify features, in the driving data, associated with the trigger events;
   when a high risk driving situation occurs:
      detecting the high risk driving situation in real time driving data by using the machine learning model to identify the features associated with the trigger events;
      performing a defensive driving maneuver in response to the detection of the high risk driving situation;
      further training the machine learning model, using the identified features associated with the trigger events, to identify a secondary trigger event;
      wherein secondary trigger event comprises features of sensor data which follow the high risk driving situation and were not initially identified as the trigger events, and the secondary trigger event is predicted by the features that are predictive of the trigger events; and
      using the secondary trigger event as training data to further train the machine learning model to refine the identification of the features, in the driving data, associated with the trigger events; and generating a prediction of the high risk driving situation in real time driving data by using the machine learning model to identify the features associated with the secondary trigger event, wherein at least one trigger event includes hard braking and the secondary trigger event includes turning on hazard lights.

8. The non-transitory computer-readable medium of claim 7, further comprising:

using second portions of the driving data where no trigger events are identified, further training the machine learning model to ignore features common to both the first portions and the second portions.

9. The non-transitory computer-readable medium of claim 7, wherein the driving data comprises the sensor data, and wherein the identifying of the trigger events comprises analyzing the sensor data to identify one or more of air bag deployment, the hard braking, fast acceleration, swerving, close proximity to obstacles, or collision.

10. The non-transitory computer-readable medium of claim 7, wherein the driving data comprises one or more of vehicle position information, vehicle speed information, or vehicle trajectory information of one or more vehicles.

11. The non-transitory computer-readable medium of claim 7, wherein the defensive maneuver comprises a maneuver that reduces risk of a current driving situation, and
wherein the risk comprises a probability that a driving situation will result in the trigger event.

12. The non-transitory computer-readable medium of claim 7, wherein the identifying of the trigger events in the driving data comprises:

receiving a trigger event definition of the trigger event, defining one or more thresholds of the driving data; and identifying the trigger event based on the trigger event definition including the sensor data exceeding the one or more thresholds.

13. A system for detecting high risk driving situations, the system comprising:

one or more sensors configured to generate driving data;

one or more processors and a memory storing a machine learning model, wherein the machine learning model is trained to identify features associated with trigger events in first portions of the driving data corresponding to periods of time preceding the trigger events;

wherein the machine learning model is further configured to detect a high risk driving situation in real-time driving data when the high risk driving situation occurs by identifying the features associated with the trigger events in the real-time driving data;

wherein the machine learning model is further trained to identify a secondary trigger event that comprises features of sensor data which follow the high risk driving situation and were not initially identified as the trigger events, and the secondary trigger event is predicted by the features that are predictive of the trigger events;

wherein the secondary trigger event is used as training data to further train the machine learning model to refine the identification of the features, in the driving data, associated with the trigger events;

wherein the secondary trigger event is further used to generate a prediction of the high risk driving situation in real time driving data by using the machine learning model to identify the features associated with the secondary trigger event;

wherein at least one trigger event includes hard braking and the secondary trigger event includes turning on hazard lights; and a vehicle controller configured to perform a defensive driving maneuver in response to the detection of the high risk driving situation.

14. The system of claim 13, wherein the machine learning model is further trained, using second portions of the driving data where no trigger events are identified, to ignore features common to both the first portions and the second portions.

15. The system of claim 13, wherein the trigger events comprise one or more of air bag deployment, the hard braking, fast acceleration, swerving, close proximity to obstacles, or collision.

16. The system of claim 13, wherein the defensive maneuver comprises a maneuver that reduces risk of a current driving situation, and
wherein the risk comprises a probability that a driving situation will result in the trigger event.

17. The system of claim 13, further including:

a trigger event identifier configured to identify the trigger event in the driving data based on one or more trigger event definitions including the sensor data exceeding one or more thresholds.

18. The system of claim 13, wherein the one or more sensors comprise one or more of a camera, radar, LIDAR, sonar, GPS, or any sensor on a vehicle CAN bus.

* * * * *